United States Patent
Sailer et al.

[11] 4,012,591
[45] Mar. 15, 1977

[54] CIRCUIT ARRANGEMENT FOR THE PHASE CONTROL OF A CLOCK SIGNAL

[75] Inventors: Heinrich Sailer, Munich; Gero Schollmeier, Gauting, both of Germany

[73] Assignee: Siemens Aktiengesellschaft, Munich, Germany

[22] Filed: June 18, 1974

[21] Appl. No.: 480,564

[30] Foreign Application Priority Data

June 20, 1973 Germany .................. 2331601

[52] U.S. Cl. .................. 178/69.1; 325/42; 329/104
[51] Int. Cl.[2] .................. H04L 7/00; H03K 9/00
[58] Field of Search .......... 329/104, 109; 325/42; 178/69.5 R

[56] References Cited
UNITED STATES PATENTS

| | | | |
|---|---|---|---|
| 3,378,771 | 4/1968 | Van Gerwen et al. | 325/42 |
| 3,388,330 | 6/1968 | Kretzmer | 325/42 |
| 3,560,855 | 2/1971 | Schroeder | 325/42 |
| 3,585,298 | 6/1971 | Liberman | 178/69.5 R |
| 3,633,115 | 1/1972 | Epstein | 178/69.5 R |
| 3,670,251 | 6/1972 | Shintani et al. | 329/104 |

Primary Examiner—Malcolm A. Morrison
Assistant Examiner—Errol A. Krass

[57] ABSTRACT

Apparatus for controlling the phase of a clock signal in a data transmission system is described. In the latter system the data signal is pulse amplitude modulated, routed to a receiver-demodulator over a transmission path, the data signal retrieved by means of a sampling circuit and coupled to a data sink. A difference signal is produced from the demodulated and the data signals; the amplitudes of the difference signal characterize the amplitude differences between the demodulated and the data signals at predetermined sampling instants. Using the demodulated signal a slope signal, which is indicative of the slope of the demodulated signal at the sampling instants is produced. The difference and slope signals are multiplied producing a product signal having amplitudes equal to the product of the latter two signals. The product signal forms a control signal for altering the phase of the clock signal by adding to or suppressing pulses emitted from a frequency divider.

4 Claims, 5 Drawing Figures

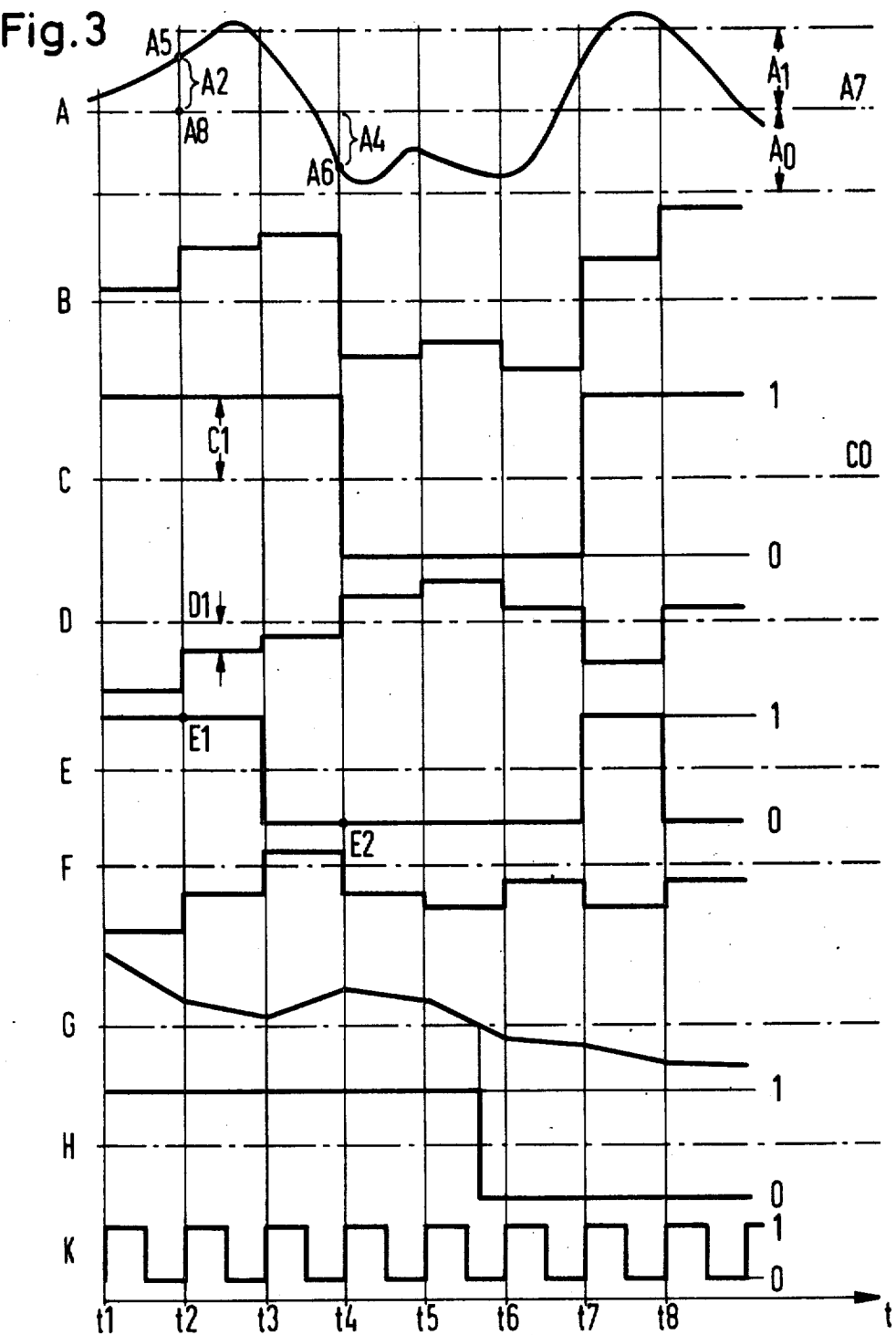

CIRCUIT ARRANGEMENT FOR THE PHASE CONTROL OF A CLOCK SIGNAL

BACKGROUND OF THE INVENTION

The invention relates to a circuit arrangement for the control of a clock signal which is generated through the use of an oscillator and a frequency altering means, the phase positions of which clock signal can be varied by means of a control signal and by which sampling instants are fixed.

According to a prior art data transmission method, data from a data source in the time frame of a bit pattern are coupled to a transmitter in the form of a baseband signal, and after pulse amplitude modulation, transmitted over a transmission path to a demodulator located at the receiver. By way of example, a telephone line may be provided as a transmission path. A binary signal representing the data transmitted is derived at the receiver from the demodulated signal produced by the demodulator through the use of a sampling circuit. The demodulated signal in the sampling circuit is sampled at instants which are dependent on the phase position of a clock signal. In the case of large delay/frequency and/or amplitude/frequency distortions, large linear distortions of the demodulated signal result which may cause a faulty transmission of the data.

It is an object of the invention to provide a circuit arrangement of little complexity for the phase control of a clock signal for compensating for even large linear distortions.

SUMMARY OF THE INVENTION

The foregoing and other objects of the invention are achieved in that a demodulated signal and a data signal are routed to a subtraction circuit from which a difference signal is obtained. The amplitudes of the difference signal characterize the amplitude differences between the demodulated signal and the data signal at the sampling instants. In addition, a slope signal is generated by means of a differentiator, that characterizes the slope of the demodulated signal at the sampling instants. The difference signal and the slope signal are routed to a multiplier circuit which emits a product signal whose amplitudes equal the product of the amplitudes of the differentiating signal and the slope signal. A control signal is obtained through the use of the product signal with the control signal causing variation of the phase position of the clock signal.

The circuit arrangement according to the invention is distinguished by the fact that the sides of the clock signal and the sampling instants can be fixed optimally, even if the amplitude errors of the demodulated signal equal the maximum or minimum nominal amplitude of the demodulated signal.

If particularly large linear distortions and correspondingly large amplitude errors of the demodulated signal must be taken into account, it is convenient that the data signal be routed to the differentiator over an equalizer, with the equalizer being so set that it partially counteracts linear distortions on the transmission path.

The circuit arrangement according to the invention has proved excellent for use with partial-response pulses.

BRIEF DESCRIPTION OF THE DRAWINGS

The principles of the invention will be more readily understood by reference to the description of a preferred embodiment given hereinbelow in conjunction with the five figure drawings wherein like reference characters designate like or corresponding parts.

FIG. 3 is a time waveform diagram showing signals appearing during the operation of the data transmission system illustrated in FIG. 1;

DETAILED DESCRIPTION OF THE DRAWINGS

Figure 1:
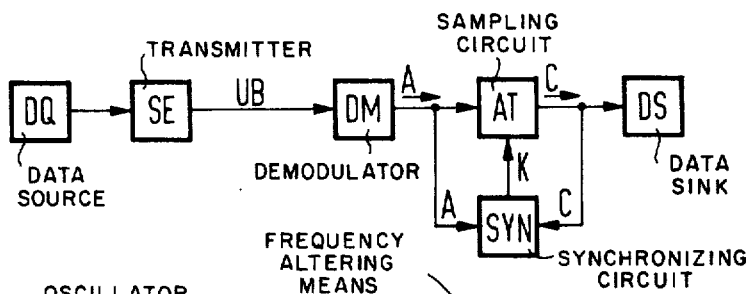
FIG. 1 is a block-schematic diagram of a data transmission system having components constructed according to the invention.

FIG. 1 shows a data source DQ which supplies data in the form of a binary signal whose binary values are allocated to two different amplitude values. The two binary values of the binary signals are hereinafter referred to as 0 and 1. The binary values of the binary signal supplied by the data source DQ appear in the time frame of a bit pattern.

The binary signal of the data source DQ is routed to a transmitter SE, is converted in frequency through pulse amplitude modulation and transmitted to a demodulator DM arranged at the receiver. By way of example, partial-response pulses may be allocated to the individual binary values of the binary signal output from the data source DQ. A telephone circuit may be provided as a transmission path.

The demodulator DM removes the effect of the pulse amplitude modulation and delivers the demodulated signal A. In a sampling circuit AT the demodulated signal A is sampled at the sampling instants which are dependent on a clock signal K. The clock signal K is obtained through the use of the synchronization unit SYN. Data signal C is delivered to a data sink DS over the output of sampling circuit AT. The data signal C largely resembles the binary signal output by the data source DQ. By way of example, a teletypewriter or a data display device may be provided as data sink DS.

If a binary signal if fed from the data source DQ to the transmitter SE, the data signal C is, likewise, a binary signal. However, if a signal having several amplitude levels is routed to the transmitter SE, the data signal C, too, will have several amplitude levels by which the data can be transmitted are characterized.

Figure 2:
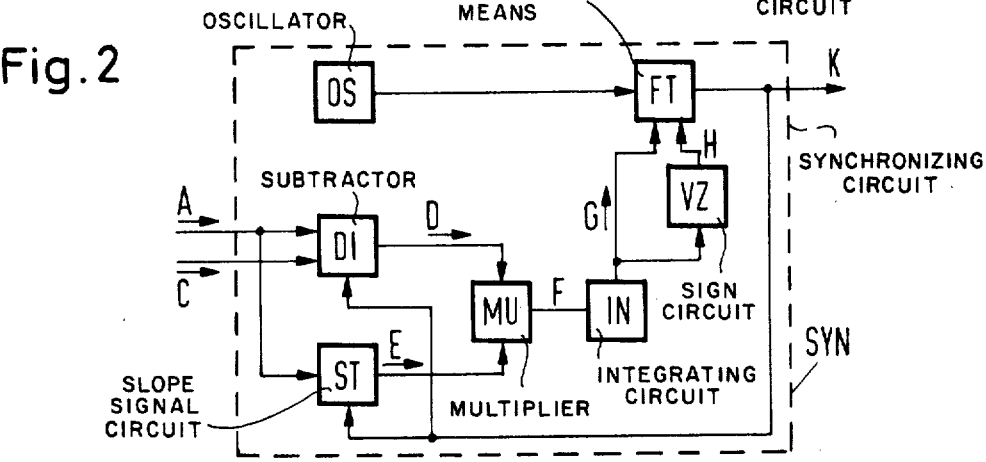
FIG. 2 is a block-schematic diagram of a preferred embodiment of a synchronization unit used in the data transmission system shown in FIG. 1.

FIG. 2 details a preferred embodiment of the synchronization unit SYN whose mode of operation is described with reference to the signals shown in FIG. 3. The directions of abscissas of the diagrams illustrated in FIG. 3 refer to the time $t$.

The demodulated signal A shown in FIG. 3 operates in the range of two set points A0 and A1. The sampling instants $t1$, $t2$, $t3$, $t4$, $t5$, $t6$, $t7$ and $t8$, which are fixed by the positive going edges of the clock signal K are shown at the bottom of FIG. 3. It is assumed that the amplitudes of the signal A at the sampling instants $t1$ to $t8$ are faulty. By way of example, the amplitude A2 appearing at the sampling instant $t2$ should equal the amplitude A1, and the amplitude A4 should equal the amplitude A0.

The demodulated signal A is sampled at the sampling instants $t1$ to $t8$ by means of the clock signal K so that signal B is obtained first, and thereafter, signal C. The amplitude of the signal B from the sampling instant $t2$ equals the amplitude of the signal A at the sampling instant $t1$. Similarly, the amplitude of signal B from sampling instant $t2$ to sampling instant $t3$ equals amplitude A2. Values 1 of signal C are allocated to positive amplitudes above the dash-dotted zero line of signal B and values 0 of signal C are allocated to negative amplitudes below the dash-dotted zero line of the signal.

Signal C represents the data transmitted. By way of example, the binary values 11100011 are transmitted from the sampling instant $t1$ to the sampling instant $t8$. Thus, it is assumed that a binary signal resembling the signal C is routed to the transmitter SE shown in FIG. 1.

Signals A and C are routed to a subtraction or difference signal producing circuit D1 shown in FIG. 2, which emits the difference signal D as a function of the amplitudes of the signals A and C appearing at sampling instants $t1$ to $t8$. By way of example, the amplitude D1 equals the difference between the amplitude A2 appearing at the sampling instant $t2$ minus the amplitude C1.

The demodulated signal A is, moreover, routed to the slope signal circuit ST from which the signal E is obtained. Signal E indicates the slope of the demodulated signal at the sampling instants. In the present embodiment, to represent the slope, only the algebraic sign thereof is taken into consideration. The actual magnitude of the slope, too, could be employed.

At instant $t2$ the slope at point A5 is positive, so that the signal E at point E1 has a binary value 1. At instant $t4$ the slope at point A6 is negative, so that the signal at point E2 has the binary value 0. As generally known, the slope is dependent on the angle formed at points A5 or A6 by the tangent and the dash-dotted zero line A7.

Signals D and E are fed to a multiplier circuit MU in which the product of the amplitudes of signals D and E is formed. If, for example, the numerals +1 or −1 are allocated to the amplitudes at points E1 or E2, the amplitudes of signal D from sampling instant $t1$ to sampling instant $t3$ are multiplied by the factor +1 for the product formation and, thus, do not vary. From sampling instant $t3$ to sampling instant $t4$ the amplitude of signal D is multiplied by the factor −1, so that in the case of a negative absolute value of the amplitude of signal D, a positive amplitude of the product signal F is obtained.

The product signal F is routed to the integrating circuit IN, which results in the signal G (FIG. 3) through integration. In a sign circuit VZ, signal H is derived as a function of the sign of signal G. Thus, as long as signal G is above the dash-dotted zero line, signal H has the binary value 1. After instant $t5$, signal G runs below the dash-dotted zero line, so that signal H assumes the binary value 0 after crossing the zero-axis.

The clock signal K is derived through the use of the oscillator OS and the clock frequency altering circuit FT. The division ratio of the clock frequency altering circuit FT varies as a function of signals G and H. If signal H assumes the binary value 1, all the more pulses are inserted into a pulse train in the frequency FT, and the greater the absolute value of the amplitude of signal G. In this way, the edges of the clock signal K are delayed. If signal H assumes the binary value O, all the more pulses are suppressed in the frequency divider FT the greater the absolute value of the amplitude of signal G. In this way, the edges of the clock signal K are advanced in time. Signals G and H are therefore control signals, by means of which the edges of the clock signals K are displaced. The means and method for elimination or insertion of pulses in the frequency divider FT is well known and therefore not described in detail. Pulse adding and deleting circuits used for correcting the phase relationships of timing pulses of the type here in question are described in U.S. Pat. Nos. 3,401,342 and 3,585,298.

Figure 4:
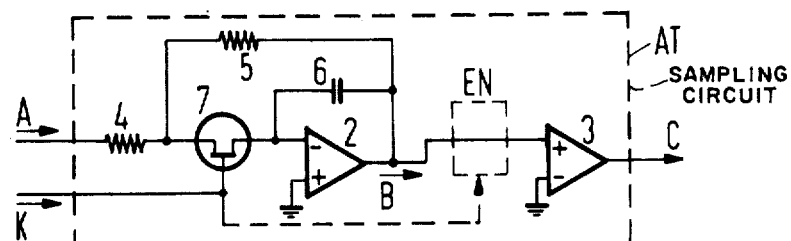
FIG. 4 is a schematic diagram of a preferred embodiment of the sampling circuit in the FIG. 1 embodiment.

FIG. 4 shows a preferred embodiment of the sampling circuit AT in the FIG. 1 embodiment. It comprises the two operational amplifiers 2 and 3, resistors 4 and 5, capacitor 6, and field-effect transistor 7. The field-effect transistor 7 is placed in the conductive state, using clock signal K, at the instants $t1$ to $t8$, so that signal A is fed to an input of the operational amplifier 2 over the resistor 4. An antiphase signal is emitted to the capacitor 6 and the resistor 5 over the output of the operational amplifier 2. Amplification factor one is set through the use of the resistors 4 and 5, and by means of the capacitor 6, the amplitude of signal A is stored even during the time that the field-effect transistor 7 is blocked. In this way, signal B is amplified and transferred to an input of the operational amplifier 3 over the output of the operational amplifier 2. The operational amplifier 3 acts like a threshold circuit, whose threshold value is represented by the zero line CO shown in FIG. 3 in the case of signal C. A signal C with the binary values 1 or 0 is emitted from the output of the operational amplifier 3 in the case of positive or negative amplitudes of signal B.

If very large distortions are involved, it is convenient to arrange an equalizer EN between the output of the operational amplifier 2 and the input of the operational amplifier 3, whereby the equalizer EN takes the linear distortion of the transmission path shown in FIG. 1 into consideration. This measure may, for example, be convenient if the error of the demodulated signal A shown in FIG. 3 is greater than the absolute values A1 or A0. Signals B and C are delayed with the aid of such an equalizer. To take this delay into consideration, signal A, delayed by an equivalent value, may be fed to the synchronization unit SYN illustrated in FIGS. 1 and 2.

Figure 5:
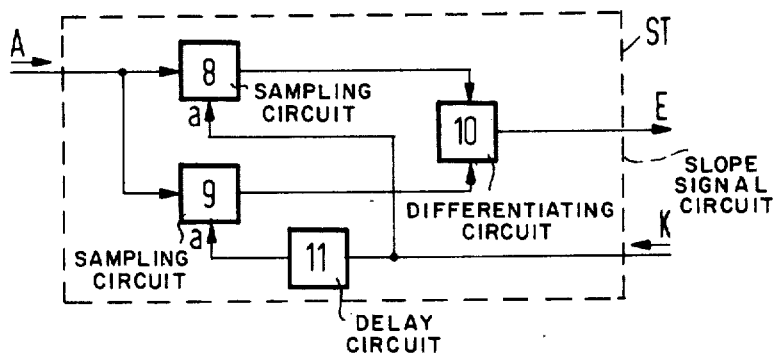
FIG. 5 is a block schematic diagram of a preferred embodiment of a circuit for determining the slope of the demodulated signal.

FIG. 5 shows in detail the slope signal circuit ST, also shown in FIG. 2. The demodulated signal A is fed to both sampling circuits 8 and 9 which cause a sampling at two different instants. For example, the clock signal K is fed to the sampling circuit 8 over the input $a$ of the sampling circuit 8 without delay, and a delayed signal is fed over the input $a$ to the sampling circuit 9 by means of the delay circuit 11. Signal A is thus sampled at the sampling instants and shortly after the sampling instants. Signals are emitted from the outputs of the sampling circuits 8 or 9, as the case may be, which characterize the amplitudes of signal A at two instants succeeding one another at short intervals. These signals are fed to the differentiating circuit 10 by means of which the slope signal E is determined.

The preferred embodiment of the invention described hereinabove is intended only to be exemplary of the principles of the invention. It is contemplated that the described embodiment can be modified or changed in a variety of ways, while remaining within the scope of the invention, as defined by the appended claims.

We claim:

1. In a data transmission system wherein data signals are pulse amplitude modulated, transmitted, received, demodulated and applied to a data sink, apparatus for controlling the phase of a clock signal, comprising:
   means for producing said clock signal,
   subtraction means for receiving said data and demodulated signals and producing a difference signal having amplitudes which characterize the amplitude differences between said data and said demodulated signals at predetermined sampling instants,
   means for generating a slope signal having a value indicative of the slope of said demodulated signal,
   multiplier means coupled to said subtraction means and said generating means for producing a signal having amplitudes which are the products of the amplitudes of said difference and said slope signals and
   means for receiving said clock signal and adjusting the phase position of said clock signal responsive to said product signal.

2. The apparatus defined in claim 1 wherein said means for producing said clock signal is an oscillator coupled to a frequency altering means, said apparatus further comprising:
   integrating means for producing a signal whose value is the integral of said product signal,
   sign circuit means for receiving said integral signal and producing a signal which is indicative of the polarity of said integral signal, and,
   means for supplying said integral signal and said polarity indicating signal to said altering means, said frequency altering means altering the spacing between segments of said clock signal in dependence upon the values of said integral signal and said polarity indicating signal.

3. The apparatus defined in claim 1 wherein said means for generating a slope signal comprises:
   first and second sampling means for receiving said demodulated signal and sampling it at succeeding different instants of time and for producing outputs indicating the amplitudes of said demodulated signal at said instants of time and
   differentiating circuit means for producing said slope signal from said first and second sampling means outputs.

4. The apparatus defined in claim 3 further comprising:
   third sampling means including equalizer means for counteracting the linear distortions occurring in the transmission of said data signal and for coupling at least partially equalized data signals to said subtracting means.

* * * * *